United States Patent
Rizika et al.

(10) Patent No.: US 7,270,873 B2
(45) Date of Patent: *Sep. 18, 2007

(54) ANTI-MARKING COVERINGS FOR PRINTING PRESSES

(75) Inventors: Daniel J. Rizika, Wellesley, MA (US); Gary Litman, Framingham, MA (US); Joseph Llanes, West Bridgewater, MA (US)

(73) Assignee: Brite Ideas, Inc., Ashland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/968,231

(22) Filed: Oct. 19, 2004

(65) Prior Publication Data

US 2005/0106968 A1    May 19, 2005

Related U.S. Application Data

(63) Continuation of application No. 10/197,837, filed on Jul. 18, 2002, now Pat. No. 6,811,863.

(60) Provisional application No. 60/306,791, filed on Jul. 20, 2001.

(51) Int. Cl.
*B32B 3/26* (2006.01)
*B41F 21/00* (2006.01)

(52) U.S. Cl. .................. 428/316.6; 428/909; 428/543; 428/319.3; 428/319.7; 428/319.1; 101/415.1; 101/401.4; 442/221

(58) Field of Classification Search ............ 428/316.6, 428/909, 543, 319.3, 319.7; 101/415.1, 401.4; 442/221

See application file for complete search history.

(56) References Cited

U.S. PATENT DOCUMENTS

| | | | |
|---|---|---|---|
| 2,085,845 A | 7/1937 | Binkley | |
| 2,555,319 A | 6/1951 | Cross | |
| 2,740,355 A | 4/1956 | Wimpfheimer | |
| 2,804,417 A | 8/1957 | Cross et al. | |
| 3,126,826 A | 3/1964 | Fischer | |
| 3,261,288 A | 7/1966 | Dickerson | |
| 3,308,522 A * | 3/1967 | Miller | 226/190 |
| 3,791,644 A | 2/1974 | DeMoore | |
| 4,402,267 A | 9/1983 | DeMoore | |
| 4,688,784 A | 8/1987 | Wirz | |
| 4,694,750 A | 9/1987 | Greene | |
| 5,042,383 A | 8/1991 | Wirz | |
| 5,042,384 A | 8/1991 | DeMoore et al. | |
| 5,088,404 A * | 2/1992 | MacConnell et al. | 101/232 |
| 5,320,042 A | 6/1994 | Schwopfinger | |
| 5,415,098 A | 5/1995 | Ward | |

(Continued)

*Primary Examiner*—Hai Vo
(74) *Attorney, Agent, or Firm*—Nutter, McClennen & Fish, LLP

(57) ABSTRACT

In a printing press and attached onto the transfer cylinders, an anti-marking system that uniformly supports the transport and the release of the wet printed sheet from one station to the next. The anti-marking sheet consists of a two plus layer system, the outer layer being a textured surface and the inner layer being a microcellular material that is both compressible and resilient. The outer textured layer may be treated with either conductive/anti-static layers or an ink repellent layer or both. The two plus layer system is easily attached to both transfer cylinders and tracking/skeleton wheels using any combination of fixtures from Velcro™, magnetic, metallic, and pressure sensitive double sided tape to elastic loops.

17 Claims, 6 Drawing Sheets

U.S. PATENT DOCUMENTS

| | | |
|---|---|---|
| 5,579,691 A | 12/1996 | Voge |
| 5,775,225 A | 7/1998 | Saitou |
| 5,829,354 A | 11/1998 | Buckley |
| 5,842,412 A | 12/1998 | Greenway et al. |
| 5,915,305 A * | 6/1999 | Ward et al. .............. 101/416.1 |
| 6,105,499 A * | 8/2000 | Helmstadter et al. .... 101/416.1 |
| 6,203,914 B1 | 3/2001 | Sudo et al. |
| 6,244,178 B1 | 6/2001 | DeMoore et al. |
| 6,811,863 B2 * | 11/2004 | Rizika et al. ............ 428/304.4 |

* cited by examiner

COMPRESSED AIR

ANTI-MARKING COVERINGS FOR PRINTING PRESSES

RELATED APPLICATIONS

This application is a continuation application of U.S. patent application Ser. No. 10/197,837, filed Jul. 18, 2002 now U.S. Pat. No. 6,811,863, which claims priority to U.S. patent application Ser. No. 60/306,791, filed Jul. 20, 2001 and entitled Anti-Marking Coverings for Printing Presses.

FIELD OF THE INVENTION

The present invention pertains to an improved anti-marking sheet and method for providing improved support along the entire width of a freshly printed sheet material in a printing press or similar machine and particularly to an improved anti-marking sheet/jacket for a print press transfer/perfector cylinder.

BACKGROUND OF THE INVENTION

Since the first printing press was placed into operation, operators have wrestled with the problem of freshly printed sheets becoming undesirably marked as they travel from one printing station to the next. To solve this problem, press manufacturers and innovators have tried various methods ranging from tracking/skeleton wheels, pneumatic devices, to cylindrical coverings of sandpaper, glass beaded paper, dimpled metal and loose mesh fabric. While most of these devices are effective to some degree, none of them fully satisfy the needs of a printer. A brief history illustrating the development of such anti-marking systems is outlined below.

In U.S. Pat. No. 2,085,845, Binkley applies "a coating granular material such as silicon carbide, emery, etc." onto the face of the fabric which has a barrier coating adhered onto rear side and is adhered to the make-ready and then clamped to the tympan roll. Here, Binkley asserts that using a sandpaper-like material will provide the advantage of decreasing the marking of freshly printed sheets. In U.S. Pat. No. 2,555,319, Cross also studies the application of granular materials to rolls within a printing machine and tests granular materials ranging from glass culets, silicon carbide and aluminum oxide and compares them to spherical glass beads. He asserts that the spherical glass beads offer a smooth and round uniform surface that is superior to that of granular grit. Cross further asserts that spherical beads allow the freshly printed/inked sheet to be uniformly supported by the tops of millions of uniform glass beads resulting in a decrease of marking printed sheets. Cross also teaches of both the benefits of back coating a porous substrate and over-coating the beaded side to improve adhesion of the glass beads to the substrate as well as to aid in repelling printing inks/solvents.

In U.S. Pat. No. 4,694,750, Greene attempts to improve on known rolls having granular surfaces by using "an elastic member that is attachable to each flange and is stretchably positionable around the circumferential granular surface." Greene's use of elastic bands to make an easily installable anti-marking product falls short in two areas: first the elastic bands impede use of the full width of the cylinder (thus limit sheet size). Second, since the elastic bands run circumferentially around the cylinder, they do not provide adequate uniform tension across the entire sheet resulting in movement of the granular sheet and ultimately marking results.

In U.S. Pat. No. 4,688,784, Wurz employs perforations in various textured surfaced anti-marking sheets that come into alignment with a hole or bore of the air ducts in the cylinder. The purpose of using compressed air is to aide in the transport of the freshly printed sheet as it travels mark-free from one printing station to the next.

In U.S. Pat. No. 3,791,641, DeMoore uses an ink repellent PTFE sheet that is affixed to skeleton wheel. Later, in U.S. Pat. No. 4,402,267, DeMoore improves upon this design by adding "a loosely retained ink repellent fabric covering" known in the industry as SUPER BLUE™ over the cylinder sheet. In U.S. Pat. No. 5,842,412, Greenway et al. also uses a light weight fabric with preferred axial air permeability not less than about 0.138 cfm and a surface structure with closely spaced features of a spacing not more than about 0.125 inch." This fabric is known in the industry as QUACK™.

In U.S. Pat. No. 6,203,914 B1, Sudo et al. follows Cross's process for manufacturing an ink repellent anti-marking sheet as disclosed in U.S. Pat. No. 2,555,319. Sudo uses a urethane crosslinked silicone top coat well known in the industry and disclosed in U.S. Pat. No. 5,415,935 as an ink-repellent coating over the glass beaded surface.

In U.S. Pat. No. 6,244,178 B1, DeMoore recognizes the importance of easy installibility and further improves his SUPER BLUE™ fabric to include asserted improvements such as pre-stretched, pressed flat and pre-cut to the cylinder dimensions complete with anti static/conductive filaments and ink-repellent coating.

Despite the efforts made in these many patents or products in the market today, marking of printed sheets in printing presses remains problematic.

SUMMARY OF THE INVENTION

It is therefore an object of the present invention to overcome the problems of printing press anti-marking systems in the prior art, and particularly to solve the problem of wet ink marking/smearing on the sheet/web due to the contact of freshly printed sheets with the transfer cylinder or the anti-marking surface covering it. The present invention recognizes that for an anti-marking system to be optimal, it preferably meets four conditions:

1. Technically, the surface of the anti-marking system should perform its function of uniformly supporting and conveying the freshly printed sheet from one printing station to the next without marking the freshly printed sheet.
2. Installability, the anti-marking sheet/jacket should be uniformly applied to the surface of the desired cylinder. If the operator cannot easily apply the anti-marking cover uniformly over the cylinder, then ridges, bubbles and creases develop which by themselves create undesirable marks.
3. Durability, the anti-marking product should withstand contact with hundreds of thousands of printed sheets to include various thickness' and the inadvertent creased/folded sheet which typically can damage an anti-marking system.
4. Cleanability, the anti-marking surface needs to be easily cleaned upon completion of the printing job to include ink and oil residue from the printing machine.

The present invention provides an improved method and apparatus for supporting and conveying sheet or web material that has been freshly printed on at least one side wherein the printed material is supported by a cylindrical roll or skeleton or tracking wheels which has mounted on the outer surface thereof an anti-marking material having at least two layers. The anti-marking material comprises at least an outer textured surface layer and an inner microcellular layer. The outer textured surface layer is the surface that actually comes in contact with the wet printed sheet.

The contact between the outer textured surface and the wet printed ink is important to anti-marking performance. Too much surface or uneven contact will cause the wet ink to smear or mark. Too little surface or uneven contact will cause the sheet to be inadequately supported (resulting again in marking) as it is transferred from one printing station to the next. The pattern of the textured surface is therefore preferably uniform across the entire surface and strikes a delicate balance between adequate support for and good release of the wet printed sheet without marking.

A textured surface that contains uniform raised contact points spaced apart by lower areas is preferred. For embossed patterns, the percent area of the raised ridges should preferably not exceed about 60% or the contact area with the wet printed sheet will not release cleanly without marking. The percent area of the raised contact can be minimized by careful tooling of the embossing roll. Care should be taken to uniformly space the raised contact points while minimizing their surface area. The minimum area in this scenario approaches zero and is constrained only by current manufacturing processes to single digit percentages.

In accordance with another aspect of the present invention there is provided a method and apparatus for supporting and conveying sheet or web material that has been freshly printed on at least one side wherein the printed material is supported by a cylindrical roll or skeleton/tracking wheels which has mounted on the outer surface thereof an anti-marking material comprising an outer glass bead textured surface layer and an inner microcellular layer. In this embodiment, the textured surface is created by adhering glass/zirconia/plastic beads uniformly to the outer surface. Here, only the convex portions of the glass beads come in contact with the wet printed sheet. Glass beads are extremely durable and provide an excellent uniform surface to support the sheet while allowing for any excess ink to slide down the glass bead and collect in the low areas between the bead peaks.

The inner microcellular layer is the perfect compliment to the textured surface. When adhered to the planar or flat underside of the textured surface, the microcellular layer conforms to the outer surface of the cylinder ensuring a perfectly uniform outer textured surface. The key features of the microcellular layer are that it is both compressible and resilient. In one embodiment, a five pound/cubic foot polyolefin microcellular foam was extruded and laminated to the planar surface. In another embodiment, a thirty pound/cubic foot urethane microcellular foam was extruded and laminated to the planar surface. In yet another embodiment, a rubber saturated paper was laminated to the planar surface. In all these cases, the microcellular layer provided the required compression under weight/pressure and were sufficiently resilient when the weight/pressure was removed.

In accordance with one embodiment of the present invention, the build up of ink is prevented on the textured surface through the use of an ink-repellent coating applied thereon. In one embodiment, the ink-repellent coating is a crosslinkable silicone or fluorocarbon.

In accordance with another embodiment of the present invention the buildup of static or electrical charge on the textured surface is prevented through the use of either conductive coatings or an anti-static coatings applied thereon to one or both sides of the anti-marking sheet. Conductive coatings can be metal foils or metallized substrates. Anti-static coatings are preferably salt based. In order to effectively dissipate static electrical charges, it is critical to ground the surface of the anti-marking material to the cylinder or some other suitable ground.

In accordance with another aspect of the present invention, a method is provided for easily and quickly affixing an anti-marking jacket to a transfer cylinder. The process begins by precutting an anti-marking sheet of the present invention to the proper sheet dimensions for a given cylinder. Depending on the press model, cylinder location and the personal preferences of the press operator, the sheet may be either mechanically attached or adhesively adhered to the cylinder. In one embodiment, a magnetic strip was adhesively adhered to the longitudinal edges of the anti-marking sheet and magnetically attached to the cylinder.

In another embodiment, a Velcro™ or other hook and loop type fastening strip can be adhered to the longitudinal edges of the anti-marking sheet and mechanically affixed to a cylinder having a mating portion of Velcro™ affixed along its longitudinal edges. Alternatively, a fibrous Velcro™ backing can be adhesively adhered to the base of the anti-marking sheet and be mechanically affixed to the tracking/skeleton wheels having a mating portion of Velcro™ affixed along the edge of its circumference.

In a still further embodiment, a double-sided pressure sensitive tape can be adhered to the longitudinal edges of the anti-marking sheet and mechanically affixed to the cylinder. Alternatively, double-sided pressure sensitive adhesive can be adhered to the entire sheet of the present invention and then applied to the cylinder. In a further alternative, a double-sided adhesive tape can be adhered along the circumference edge of a tracking/skeleton wheel and then the anti-marking sheet can be applied to the wheel in such a manner as to form the shape of a cylinder.

In accordance with another embodiment of the present invention, a method for easily and quickly affixing an anti-marking jacket to the transfer cylinder is provided using at least one elastic loop affixed to the longitudinal edge of an anti-marking sheet of the invention. In accordance with another embodiment of the present invention, this elastic loop jacket is specifically designed to fit on a Heidelberg printing press.

In accordance with another embodiment of the present invention, a method for easily and quickly affixing an anti-marking jacket to the transfer cylinder of a Heidelberg Speedmaster 74 printing press is provided using reusable affixing hardware (for example, eight clips supported onto a stainless steel rod that slides into a sewn loop of an anti-marking sheet of the present invention) on one longitudinal edge of the present invention and a flat permanently affixed strip (stainless steel or other suitable firm strip) to the other. The operator first slides the flat end into a groove and firmly clamps it down in place. Holding the clip end of the jacket, the operator slowly rotates the cylinder until the clips come in alignment with and fit over eight pins on a support bar. The pressman next tightens a center bolt that tensions the jacket over the transfer cylinder. This jacket may be installed in five minutes. When the jacket materials useful life is over, the stainless steel rod and eight clips are saved and re-used on a new jacket saving hardware costs. Alternatively, an anti-marking sheet of the present invention may be laminated to a thin conductive sheet metal. The ends of this sheet metal may be easily die cut and bent to affix both over these eight pins as well as in the thin groove. The jacket is tensioned up in a similar manner.

In another embodiment of the present invention, holes are perforated through the anti-marking sheet of any of the above constructions allowing for pressurized air to flow through specific air feed holes bored through the transfer cylinder. Air is blown through these feed holes facilitating the mark free transport of the freshly printed sheet as it moves from one print station to the next. The microcellular layer is of particular benefit in these perforated sheets as the compressible layer forms an air tight seal between each perforated hole and the transfer cylinder's surface thus ensuring pressurized air is fully directly through each hole and does not escape laterally. The result is a uniform air pressure through each hole surrounding the entire cylinder. Constant pressure through uniform air feed holes ensures constant air volume and velocity providing for a mark free transport of the wet printed sheet.

In another embodiment of the present invention, the anti-marking sheet of the invention having at least two layers could be alternatively used for multiple other cylinder coverings besides transfer cylinders. In one embodiment the two plus layer sheet was mounted on a plate cylinder with the plate mounted thereon. In another embodiment, the two plus layer sheet was mounted on both the blanket and impression cylinders. In both the plate and impression cylinders, the outer textured layer coupled with the inner microcellular layer proved a suitable combination for improving the quality of print on the sheet. To meet the economical constraints of packing sheets, the textured surface may be omitted.

In yet another embodiment of the present invention, the anti-marking material of the invention having at least two layers could be slit into narrow width rolls that could be easily applied to the cylinders of flexographic/web printing machines for mark free transitions. The rolls of anti-marking tape were used to spiral wind around the transport and nip cylinders in such a manner that during application, the inner microcellular layer compressed and held tightly to the surface of the cylinder while the outer textured layer lay perfectly flat around the circumference of the cylinder.

BRIEF DESCRIPTION OF THE DRAWINGS

Other objects, features, and advantages of the present invention will be explained in the detailed description of the invention below, having reference to the following drawings.

DESCRIPTION OF THE PREFERRED EMBODIMENTS

Figure 1:
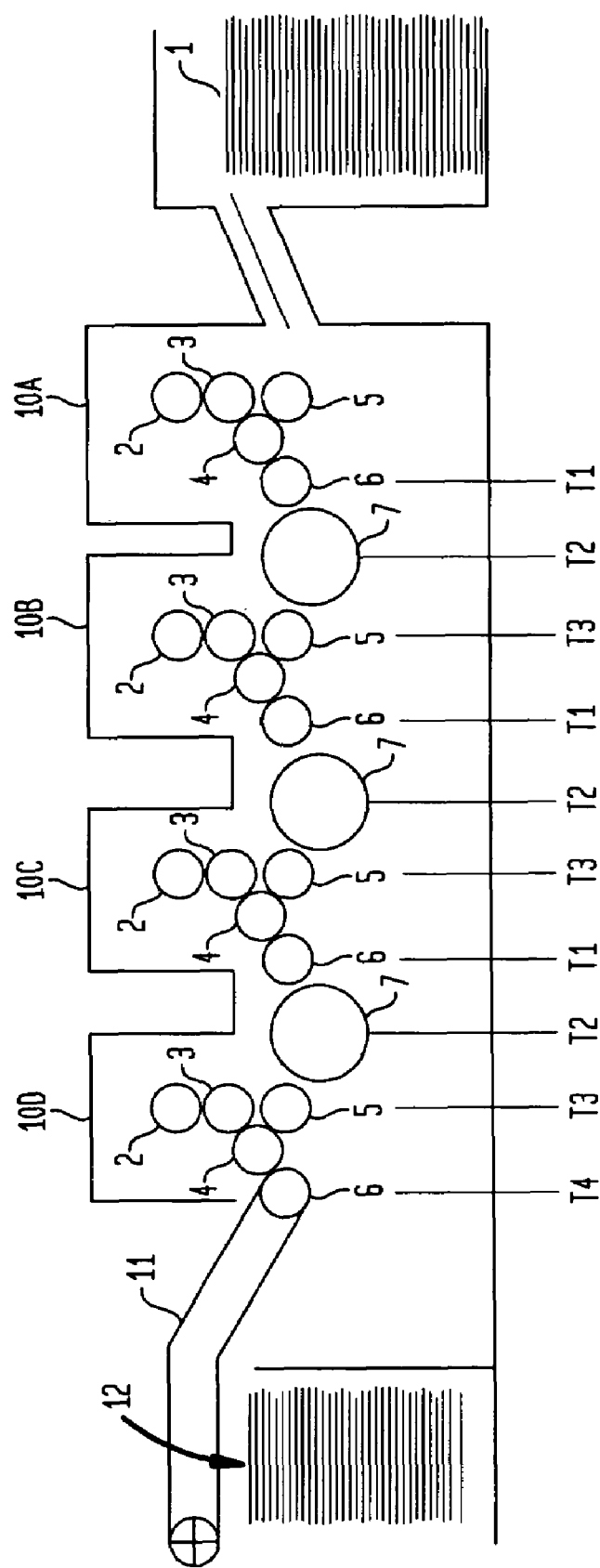
FIG. 1 is an illustration of a four color offset printing press highlighting the transfer cylinders upon which an anti-marking sheet of the present invention is applied.

Prior to describing the invention in detail, the following definitions are set forth to facilitate the understanding of the present invention.

A. Flexible substrate: Any dimensionally stable film such as polyethylene terephthalate (PET), polyethylene naphthalate (PEN, polycarbonate, polyolefins, styrene, nylon, polyether ester ketone (PEEK), polyester sulfone (PES), polyvinyl chloride (PVC), biaxially oriented polypropylene (BOPP); metal foils such as aluminum, copper, nickel tin, steel, coated steel, stainless steel, brass; paper, both natural and synthetic; and fabric, both woven and non-woven. Substrate thickness may range from about 0.5-20 thousands of an inch depending on desired total thickness. Substrates may be pre-coated with adhesion promoters, anti-statics, ink repellents, and/or a print receptive layer.

B. Textured surface: The non-smooth surface that is on the exposed side of the anti-marking material and which comes in contact with the freshly printed sheet. The textured surface may be embossed with any pattern that provides raised ridges and valleys such that the high points adequately support the freshly printed sheet. Preferred embossed patterns are similar in appearance to the hemispherical portion of the spheroidal element. Alternatively the textured surface maybe formed by partially embedding elements/particles into an adhesive/substrate. Preferred elements are spheroidal partially embedded into the adhesive layer. Alternative textured surfaces include textiles such as woven fabric that has suitable ridges resulting from the warp and fill construction. Other textured surfaces maybe created by plasma coating or sand blasting a metal surface followed by plasma/non-stick coatings.

C. Glass/plastic beads: Spheroidal elements of any refractive index having a diameter ranging from about 1 to 100 thousandths of an inch depending on desired end product. Due to their durability and natural ink repellency, spheroidal glass elements are preferred. Alternative spheroidal elements are either plastic or milling beads typically containing Zirconia/zirconium To obtain the desired textured surface these spheroidal elements are partially embedded into an adhesive layer typically supported by a flexible substrate.

D. Embossed height/partially embedded depth: The protruding height of the textured surface; the height from the apex of the protruding element to the lowest point where the embossed pattern ceases or to where the upper layer of adhesive bonds the spheroidal elements together and onto the flexible substrate. Embedded depth may be varied within a given glass bead diameter by methods well known in the art. These include but are not limited to: varying the thickness/viscosity of the adhesive layer used to initially adhere the glass beads to the flexible substrate; or by later applying a prime or tycot coating that fills in the spaces between the glass beads to control the percent of the glass bead exposed/embedded. Partially embedded depth is typically a ratio of bead diameter which ranges from about 0.05 D to 0.6 D (D is diameter of bead/embossed pattern) depending on desired end use application. For the diameter glass beads typically used, embedded bead depth ranges from about 0.1 mils to 4 mils. For larger glass beads the embedded depth will correspondingly increase to about 20 mils.

E. Microcellular layer A layer that is made up of one or more materials containing minute gaseous areas that allow the layer to compress when placed under pressure/weight and provide the layer resiliency upon release of this pressure/weight.

F. Foam: A preferred microcellular layer that can be based on polymers and cross-linked polymers ranging from urethanes, polyvinylchloride nitriles, polyolefins, hypolons, to silicones or the like. Commercially extruded foams are available from Voltek Inc. (Lawrence, Mass.), Sentenial (Hyannis, Mass.), and Rogers Corp.(Rogers, Conn.).

G. Foam-like: An alternative microcellular layer that possesses the unique qualities that allow it to act like a foam with its compressibility and resiliency. Typically, these materials are elastic polymer-saturated paper/fabric. These substrates contain small gaseous areas that allow for a degree of compressibility and resiliency even when saturated or coated with a resin. A preferred Rubber-saturated paper is available from Sunshine Paper Co. (Aurora, Colo.). A preferred Rubber/urethane saturated fabric is available form Cooley, Inc. (Pawtucket, R.I.).

H. Adhesives: Polymers used to either emboss the textured pattern or to embed and bond the elements used for the textured surface. The same polymers may be used to laminate the substrates together. Pressure sensitive adhesives (PSA), thermoplastic and thermoset resins such as phenolics, polycarbonates, polyesters, epoxys, urethanes, acrylics, nylons and polyolefins or suitable alternatives.

I. Ink repellent coatings: An optional coating that may be applied to the textured surface of the anti-marking sheet. These coatings improve the performance of the anti-marking material by repelling printing inks, increasing product life, and allowing for easier surface cleanup at the end of a printing run. Preferable ink repellent coatings are crosslinked resins of silicone (platinum addition cure, tin moisture cure, rhodium cationic radiation cure, free radical cure), fluorocarbon, Teflon, PTFE , silicone/urethane adducts, silicone/epoxy adducts, nylon, fatty acid, or carbomate.

J. Anti-static or conductive coatings: An optional coating that may be applied to both the textured surface and the rear substrate of the anti-marking sheet. These coatings serve to make the surfaces of the anti-marking material conductive thereby preventing electrical charge buildup. Anti-static coatings contain elements such as salts, graphite, etc. Preferred conductive materials include: carbon, aluminum, indium, silver, nickel, copper, tin, and stainless steel. Conductive sheet material may be laminated either between the flexible textured surface and the compressible microcellular material or to the rear of the compressible microcellular material. Conductive materials can easily be vapor deposited onto sheet or web surfaces. Alternatively, conductive materials may be chemically etched onto the surface or simply coated in solution form. Anti-static and conductive coatings may be applied before/during or after the ink repellent coating.

K. Anti-marking material: A material that is applied to the outer portion of a transfer cylinder that reduces the smearing or marking of a freshly printed wet ink sheet/web as it travels through the printing machine.

L. Transfer cylinder. Cylinders within a printing machine that facilitate the transfer or transport of a freshly printed sheet from one station to the next. Transfer cylinders are commonly referred to as delivery cylinders, transfer drums, delivery wheels, skeleton/tracking/guide wheels, transfer rollers, delivery rollers and any other movable apparatus that is capable of transferring a freshly printing substrate in a printing press.

M. Magnetic materials: A material used to mechanically affix the present invention to a transfer cylinder. A preferred magnetic material comes in sheet and roll form in varying thickness' that can be easily laminated to the rear surface of the anti-marking sheet. Typically this material is made out of an iron and possesses strong magnetic properties enabling it to attract to the steel transfer cylinder.

N. PSA materials: A pressure sensitive adhesive material used to attach the present invention to a transfer cylinder and/or alternatively laminate the layers of the anti-marking material together. Pressure sensitive adhesives can be applied in thickness ranging from about 0.5-4 thousandths of an inch and are typically polymers ranging from: urethane, acrylic, rubber, to silicone.

O. Velcro™ materials: A material used to mechanically affix the present invention to a transfer cylinder. This material is made out of two layers, one that has a barbed-like protrusion, the other is the mate to it—a dense layer of loose fibers that mechanically entangle/affix to the barbed protuberances (these layers are sometimes referred to as hook and loop fasteners). It is preferable to place the dense layer of loose fiber-like material on the backside of the anti-marking sheet, and the barbed layer on the transfer cylinder.

P. Nonwoven/woven fabric: A substrate that can be used as the flexible layer or textured surface in the anti-marking material. Commonly used materials include: nylon, polyester, polyolefin, cotton, rayon, acrylic or combinations thereof. It is preferred to use fabrics that have been scoured and heat-set for stability. They may be further processed or saturated with an elastic resin or ink repellency.

Q. Printing press: Printing presses tend to be categorized as sheet feed presses such as offset printing or web fed machines such as flexographic. Anti-marking sheets are predominantly used in offset printing as the substrate cannot be held under constant tension as it moves from one printing station to the next. Anti-marking tape that is spiral wound around support/transfer cylinders is typically used on flexographic machines.

R. Elastic Loop: The material affixed to the longitudinal edge of the present invention. The elastic loop may be made out of any elastic material such as rubber, epdin, urethane, silicone etc. The preferred materials are urethane and silicone due to their resistance to solvents and oils. The degree of elasticity (elongation) should be selected according to desired fit on the press. Likewise the thickness of the elastic loop should be selected to ensure proper fit within the transfer cylinders edge and tolerances upon rotation.

S. SM-74 Clip: The reusable hardware affixed to the longitudinal edge of an anti-marking sheet of present invention that fits on a Heidelberg Speedmaster 74 transfer cylinder. There are eight clips that are approximately 1"×1" square $50/1000$" inch thick metal with a 0.5" die punched hole through the center and a rolled lip that slides over a stainless steel ⅛" rod. The SM-74 clips are threaded onto the stainless steel rod as the rod is slipped through the sewn/notched loop of the present invention jacket. When the useful life of the jacket is over, the pressman simply orders a new jacket (without hardware) and reuses the hardware from the former jacket. This makes such jackets extremely economical.

T. SM-102 Rivet: The non-reusable hardware affixed to the longitudinal edge of an anti-marking sheet of the present invention that fits on the newer Heidelberg Speedmaster 102 transfer cylinder. There are ten rivets that fasten through the sheet after being wrapped around a steel strip. This end of the jacket fits easily into a spring bar that is already affixed to the Hidelberg transfer cylinder. The other end of the jacket can either have a stainless steel strip or an elastic/non-elastic die cut loop which fits securely on the other side of the transfer cylinder.

U. Compressible packing: Packing is an industry term that refers to the product used to pack or fill the gap that is desired between two cylinders on a printing press. This is typically part of the make-ready process where the pressman decides what thickness packing is required to run a desired paper weight. Packing can range from just a few mils (thousandths of an inch) to several hundred mils depending on the press and the cylinder. Packing prevalent in the industry today is typically paper, but film and film with PSA backing is also used. The term compressible packing is meant to describe a type of packing that is a hybrid of the current invention and traditional packing. The present invention can be used as packing in place of traditional packing on any cylinder with excellent results. To minimize cost (packing is typically a low cost item), an alternative is to use only the microcellular layer as packing. For easier installation, paper or film may be laminated to this microcellular layer; this however, adds additional cost to the compressible packing.

The examples and embodiments depicted in the drawings and described herein include anti-marking sheets of the invention having a minimum of two layers: a textured surface outer layer and a microcellular inner layer. These embodiments are for use on high speed printing equipment, for example on offset printing machines. This equipment typically uses transfer cylinders and/or skeleton/tracking wheels for handling freshly wet printed sheets between printing stages and upon delivery of the printed sheet to the discharge stack Those skilled in the art will readily understand both the benefits and flexible alternatives for mounting this new textured surface anti-marking sheet with a microcellular layer to any cylinder on printing machines.

Other and further objects and advantages of the present invention will become apparent from the following description of preferred, but not necessarily the only, forms of the present invention, taken in connection with the accompanying drawings.

The improved method and apparatus for supporting freshly printed sheet material in accordance with the present invention is typically used in high speed printing presses, most often in offset printing. A brief summary of the printing process follows by reference to FIG. 1. A sheet is feed into the printing press from the sheet feeder 1, and travels through the first color printing station 10A to be printed with the first color as the sheet is pressed between the blanket cylinder 3 and impression cylinder 4. This freshly wet printed sheet now must travel from the first printing station 10*a* to the second color printing station 10*b*. In order to accomplish this, the sheet is supported and transported with its wet ink side down over the first transfer cylinder 6 (T1). Next the sheet is transferred with its wet ink side up onto and over the intermediate transfer cylinder 7 (T2), and then over to the third transfer cylinder 5 (T3) with its wet ink side down, and then back up to receive the second color as the sheet is pressed in between the blanket cylinder 3 and the impression cylinder 4 in printing station 10*b*. This process is repeated each time as the sheet travels from one color station to the next until reaching the last station where the sheet travels again with its wet ink side down over the delivery cylinder 8 (T4) and on through the conveyer system 11 and onto the sheet stacker 12.

Figure 2A:
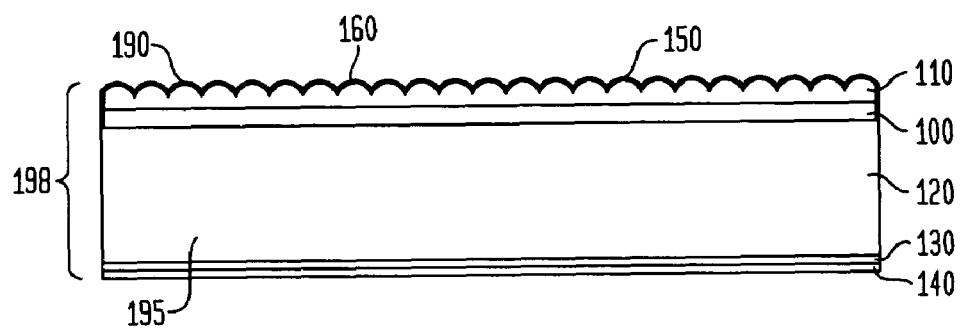
FIG. 2a is a cross-sectional view showing the layers of material of an anti-marking sheet of the invention covering the circumferential surface of a transfer cylinder of FIG. 1.
Figure 2B:
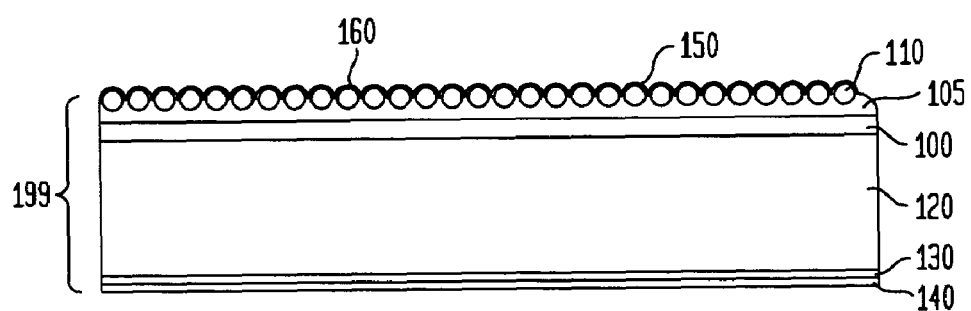
FIG. 2b is a cross-sectional view of an alternative construction of the anti-marking sheet of FIG. 2a using glass beads as the textured surface.

From the above description, one can readily understand that marking or smearing of the wet printed sheet occurs when sheet is being supported and transported with its wet ink side down over the transfer cylinders T1 and T3 on its way to the next printing station. The present invention provides an anti-marking cover having at least two layers that is easily applied to the outer surface of these transfer rolls. The layers comprise at a minimum an outer and inner layer with optional layers/coatings as portrayed in FIG. 2*a* and FIG. 2*b*. The outer layer is a durable textured surface 110 that provides a raised pattern that supports the wet ink side of the sheet being printed, and prevents the marking or smearing of the wet ink on the sheet during transfer. The inner layer is a microcellular layer 120 that allows for uniform application and support of the outer layer onto the cylinder. The microcellular layer 120 is compressible and resilient allowing for easy level installation and uniform packing. The microcellular layer further improves durability of the outer textured layer by allowing distinct areas to compress when required (creased/folded paper sheet) and then resiliently returning to its former position.

The present invention is sometimes referred to as the "two plus layer" system meaning that there are two layers required and several optional coatings/layers that can be added to improve the characteristics or installation of the present invention. The two required layers are: the outer layer 190 consisting of a minimum of the textured surface 110 and the inner layer 195 consisting of a minimum of the microcellular layer 120. Referring to the exemplary construction of FIG. 2*a*, the textured surface 110 is embossed in the pattern of hemispherical spheroids, or half spheres adhered to an optional flexible substrate 100. This pattern, though preferred, is not depicted to limit the various embossing patterns that are suitable and fall within the scope of the present invention. An optional vapor deposited aluminum conductive coating 150 can be applied onto the exposed surface of the embossed pattern 110. Upon this conductive coating an optional ink repellent coating 160 can be applied. The outer layer can then be flipped upside down and a laminating adhesive can be coated onto the underside of the flexible substrate 100 whereupon a microcellular layer 120 can be laminated. Next an optional anti-static conductive coating 140 can be applied to a flexible substrate 130 and then laminated to the underside of the microcellular layer 120. This example is for illustration only and a person of ordinary skill in the art will readily understand the various raw materials and processes that can be alternatively used to obtain similar desired results.

Numerous methods exist for the construction of an anti-marking sheet of the present invention. One skilled in the art of manufacturing either sand paper or reflective sheeting will readily understand how to partially embed glass beads onto a substrate. In U.S. Pat. No. 2,555,319 for example, Goss fully discloses the steps for manufacturing this textured surface to include prime coating the surface of the glass beads for better adhesion and also ink repellency. Such techniques can be used to manufacture the textured surface of the anti-marking sheet depicted in FIG. 2*b*. In this embodiment, the textured surface is constructed from glass beads 110 that are partially embedded into the flexible adhesive 105 supported by the flexible substrate 100. The desired end product use (type of printing press coupled with the type of sheets printed) determines both the proper selection of glass bead diameter as well as the thickness of adhesive 105 required to properly secure and embed the glass beads. Next, an anti-static material 150 can be coated upon the surface of the exposed glass beads followed by an ink repellent coating 160. This coating also falls in the valleys between the spaces of the glass beads aiding in the prevention of ink buildup and vastly improves the cleanliness of the textured surface. This outer layer can then be flipped upside down and a laminating adhesive coated onto the flexible substrate 100 where upon a microcellular layer 120 can then be laminated. Next an anti-static conductive coating 140 can be applied to a flexible substrate 130 and laminated to the underside of the microcellular layer 120. Again, this example is for illustration only, one skilled in the art will readily understand the various raw materials and processes that can be alternatively used to obtain similar desired results.

Figure 3:
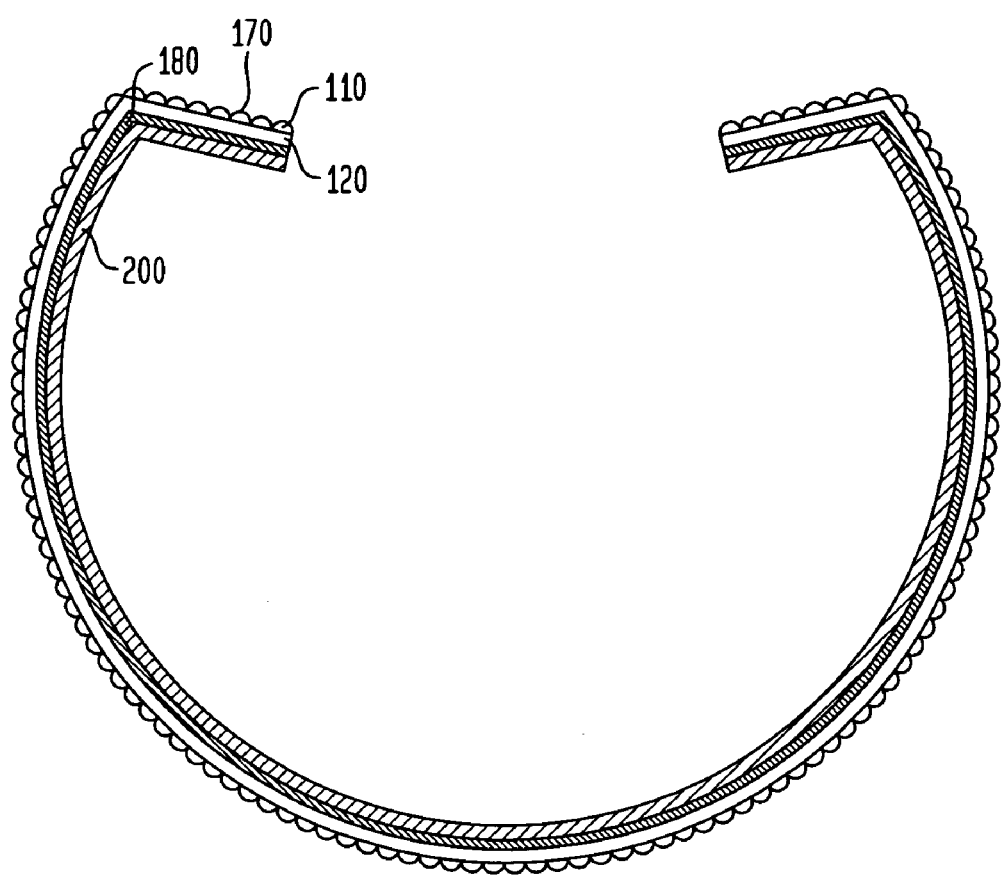
FIG. 3 is a diagram of a transfer cylinder fitted with an anti-marking sheet of the present invention.

The anti-marking sheet of the present invention may be readily modified so that it may be easily mounted to any manufacturers printing press transfer cylinder. FIG. 3 depicts the present invention as mounted onto a transfer cylinder 200. Depending on the press and the thickness of the sheet paper being run, the press operator may decide to include packing 180. The packing 180 may be secured in place by the anti-marking sheet microcellular layer or by the use of a pressure sensitive adhesive. Likewise, the anti-marking sheet may be secured to the transfer cylinder along the length of the cylinder with pressure sensitive double-sided tape. Here, the textured surface 110 can be coated simultaneously with an ink repellent and an anti-static coating 170. The microcellular layer 120 allows the operator to easily install the outer textured layer so that is lays perfectly flat against the cylinder surface thereby preventing bubbles, ridges or creases that typically occur when applying anti-marking sheets to transfer cylinders. An anti-static coating 180 can be applied to the exposed surface of the microcellular layer 120 prior to mounting it to surface of the transfer cylinder.

Figure 4:
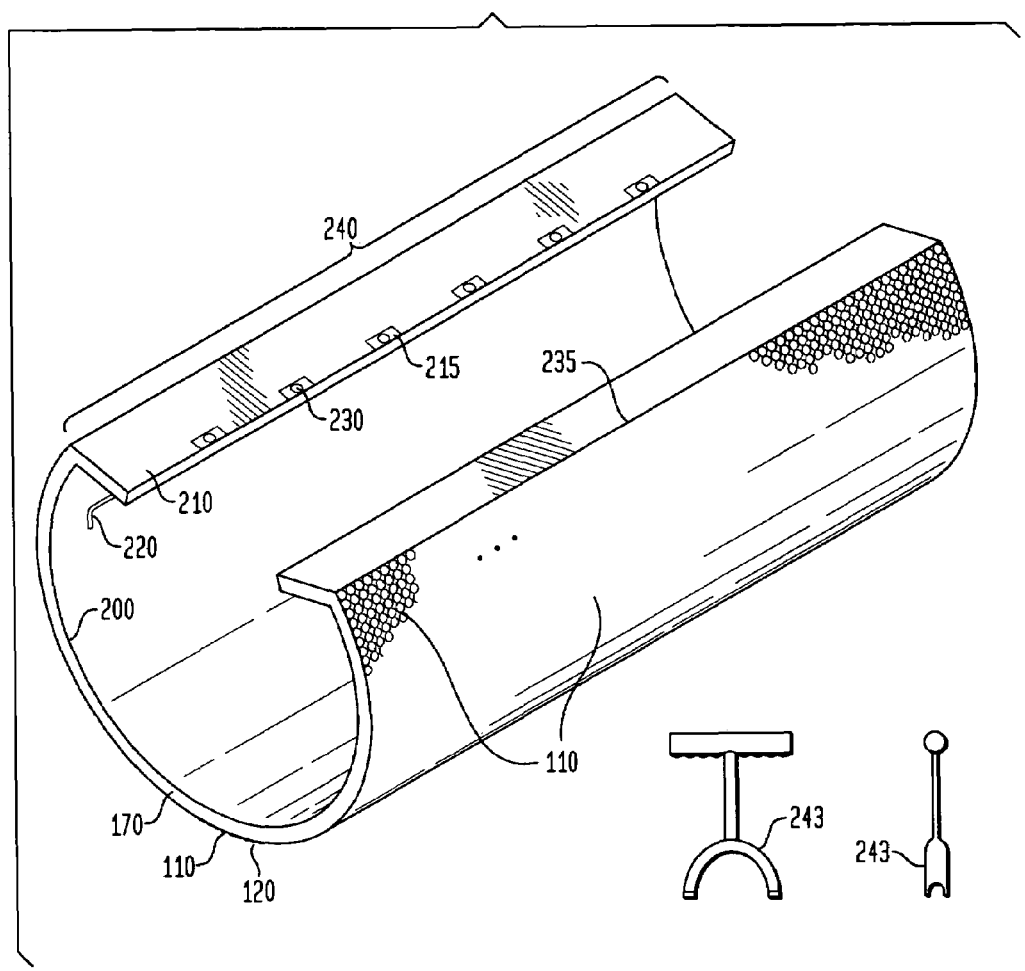
FIG. 4 is a diagram of a one step jacket of the invention that mounts on a Heidelberg printing press.

According to another embodiment of the present invention, the two plus layer anti-marking material is modified by affixing at least one elastic loop 210 to the longitudinal edge 240 of the sheet. FIG. 4 depicts a Heidelberg transfer cylinder with an elastic loop jacket of the present invention thereon mounted. The particular printing press model (transfer cylinder size) determines the placement of the die cut areas 215 along the longitudinal axis of the elastic loop 210.

To affix an anti-marking sheet of the present invention to the cylinder, the operator attaches the first longitudinal edge 235 to the cylinder 200. There are various means, as determined by the model of the press, for affixing the first longitudinal edge 235. In some presses, there is a clamp along this edge and the operator can open and slide the longitudinal edge or a flat fixture pre-mounted thereon (such a strip of stainless steel or suitable firm material) and then tightly close the clamp. In other presses a double loop jacket is preferable. Still in other presses, alternative mounting means are desired and readily understood and quickly fixtured by one skilled in the art. This is the case with the newer Heidelberg presses such as the SM102 which use slotted rivets on one side that clip into corresponding holes in a spring plate permanently affixed to one side of the transfer cylinder.

After affixing the first longitudinal edge 235, the operator slowly rotates the transfer cylinder while firmly holding the second longitudinal edge 240 of the anti-marking sheet. This step of the installation process of the anti-marking material is crucial. No matter how technically exceptional the anti-marking outer surface is, if the operator cannot install or mount this very large sheet uniformly without bubbles, ridges or creases then the product will not function properly. The present invention guarantees easy and uniform installation by providing the microcellular layer 120 that is both compressible and resilient. The microcellular layer 120 is non slip and allows the operator to achieve an excellent fit over the entire width of the transfer cylinder 200 as the cylinder is rotated. The compressible microcellular layer 120 fills in any low areas or voids due to wear or damage of the cylinder 200; and likewise compresses over any high points in the cylinder 200 making for an extremely uniform outer layer 110.

Once the second longitudinal edge 240 of the sheet is against the second longitudinal edge of the cylinder, the operator simply stretches the elastic loop 210 by applying downward pressure against the steel rod 220 using a "C" tool 243 or suitable push tool. As the elastic loop stretches, the rod can glide over the clamp heads 230 so that when the operator releases downward pressure, the steel rod 220 snaps into its locked position under the clamp heads 230. The operator repeats this process for each die cut area 215 until the present invention is firmly mounted under constant tension around the transfer cylinder 200. In this preferred embodiment, the microcellular layer 120 is under slight constant compression thus ensuring the most uniform fit at every point along the cylinder 200 such that the outer textured surface is perfectly aligned with the surface of the freshly printed wet inked sheet. This perfect alignment coupled with the technological surface texture 110, two plus layer structure, and optional coatings 170 make for a mark free transfer of the wet inked sheet from one station to the next.

The newer Heidelberg SM-74 press requires a fixture that fits over eight pins that extend out of a support bar on one side of the transfer cylinder. This support bar is then extended by rotating a single hex bolt by the pressman, thereby tensioning the jacket. There are two types of fixtures that can be used for this press, a permanent fixture and a re-useable fixture. A permanent fixture is one that cannot be easily re-used by the pressman; i.e. it is permanently affixed to the anti-marking sheet of the present invention either by riveting, sewing or adhesive bonding. A re-useable fixture is one that can be easily re-used by the pressman; this requires the upfront design of both the anti-marking sheet jacket and fixture system that readily fits over the SM-74 pins and is securely affixes the jacket to the cylinder. To meet these constraints, eight individual clips were designed and manufactured interchangeably fit the base jacket of the present invention for the SM-74 press. These clips easily slide over a stainless steel rod and fit in the die cut areas of the present invention jacket. When the jacket becomes worn, the pressman removes the clip/rod hardware from the old jacket and discards the jacket. The pressman then installs the same hardware in the new jacket making this jacket much more economical than others.

In another embodiment of the present invention, a fibrous VelcroTM tape 320 is applied to the backside of the microcellular anti-marking sheet so that it may be easily mounted to the modified surface of skeleton/tracking wheels 300 which likewise have been modified with the barbed VelcroTM tape 310.

Figure 5:
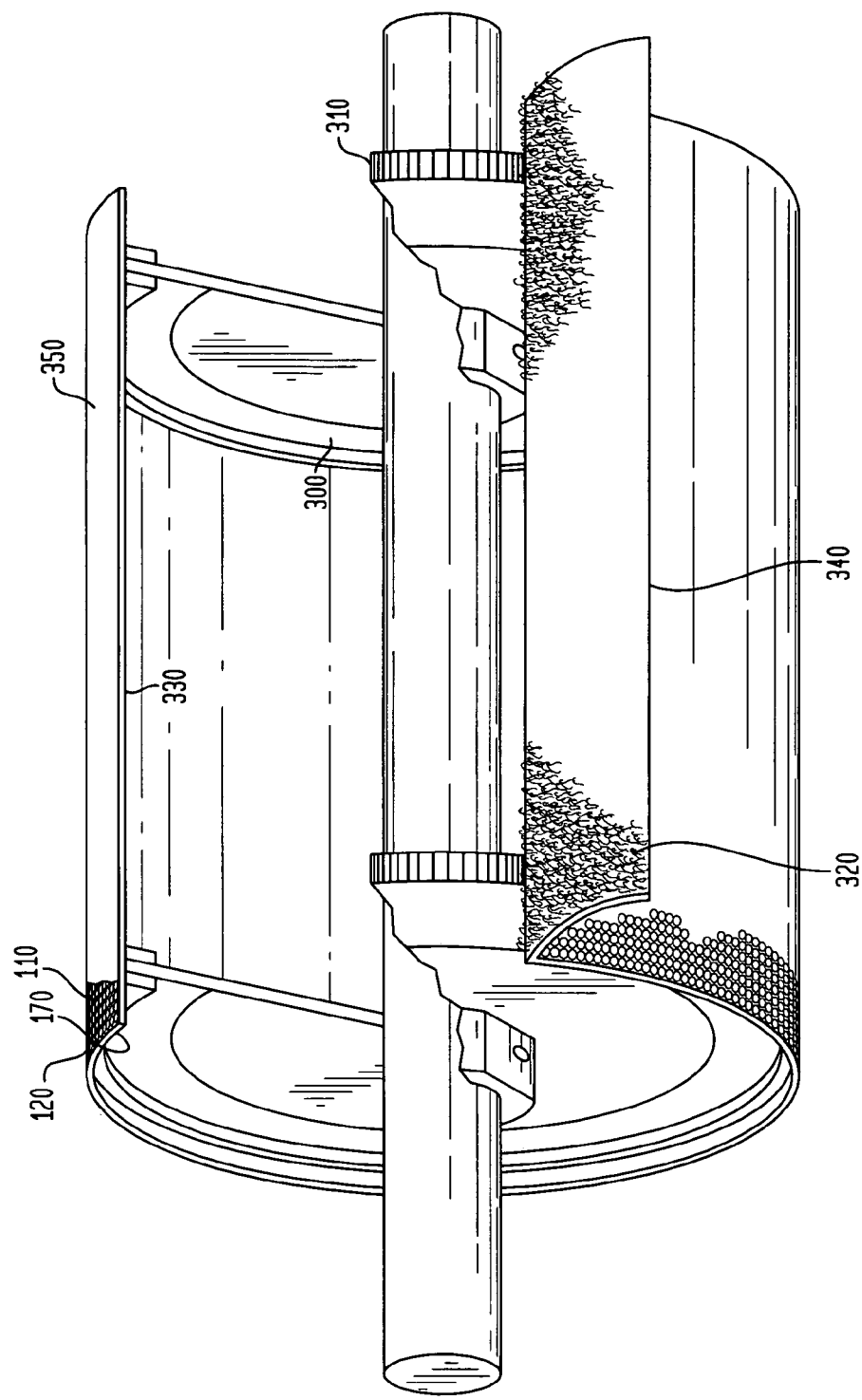
FIG. 5 is a diagram of skeleton/tracking wheels fitted with an anti-marking sheet of the present invention.

As depicted in figure 5, the operator affixes the first longitudinal edge 330 of the anti-marking sheet 350 of this embodiment to the skeleton/tracking wheels 300 by pairing up the mating surfaces of the VelcroTM tapes 310 and 320. Once firmly secured, the operator will slowly rotate the cylinder, all the while applying constant tension from the second longitudinal edge 340 in such a manner that the anti-marking sheet is applied uniformly and lays flat against the surface of the tracking wheel. Upon completion of the cylinder's rotation, the second longitudinal edge 340 is secured to the skeleton/tracking wheels 300. Unlike any other system, the present invention allows for not only quick and easy installation, but for a firm cylinder-like shape of the anti-marking sheet 350 even when installed over as few as two wheels 300. This perfect shape coupled with the technological surface texture 110, two plus layer configuration, and optional coatings 170 make for a mark free transfer of the wet inked sheet from the final print station to the discharge unit. Velcro™ tape has likewise been used to secure the present invention to transfer cylinders T1 and T3. One skilled the art will also recognize many alternatives for mounting the present invention 198/199 to transfer cylinders. Magnetic or double sided pressure sensitive adhesive tape can be alternatively used.

Figure 6:
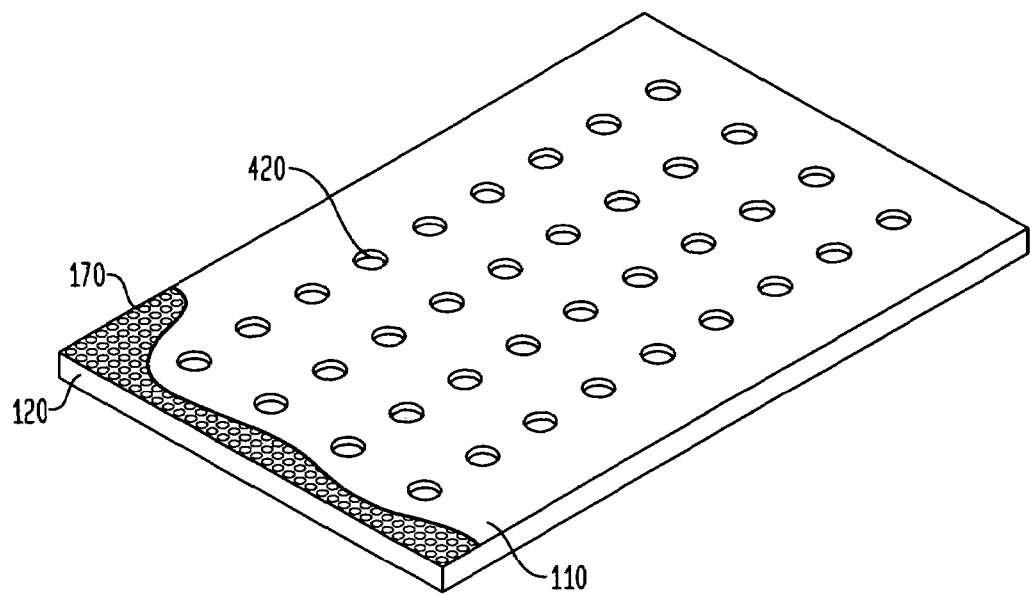
FIG. 6 is a perspective view showing an alternative embodiment of a conductive anti-static ink repellent glass beaded surface affixed to a microcellular layer, the entire sheet containing perforations for allowing pressurized air to flow through either way.

Many presses have transfer cylinders that use pressurized air to aid in the support and delivery of freshly printed sheets 430. Though this system was designed to eliminate the need for anti-marking sheets, those familiar with these presses will agree that marking still occurs. By modifying the present invention with perforations 420 (in pre-arranged locations as determined by the model printing press) marking in these presses can be greatly reduced and eliminated. A section of the present invention is illustrated in FIG. 6 with perforations 420 that allow pressurized air to flow freely through each hole.

Figure 7:
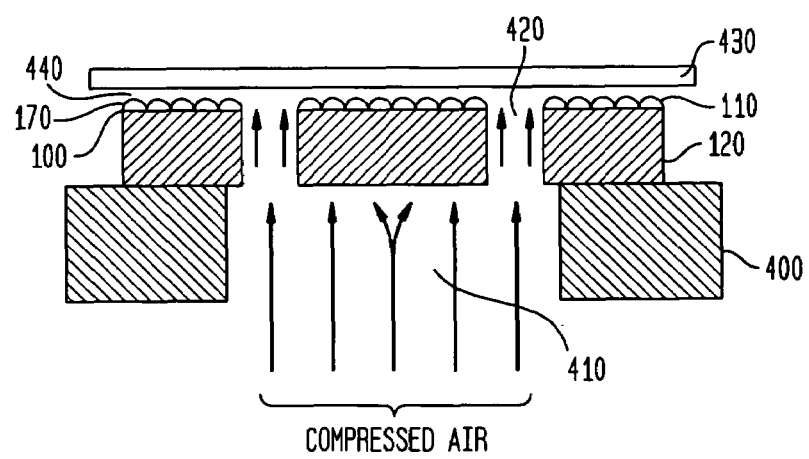
FIG. 7 is a cross-sectional view of an anti-marking sheet of the present invention having perforations.

FIG. 7 is a cross sectional view of the present invention as it is applied to the cylinder 400. The perforated holes 420 line up with the pressured air/suction feed holes 410 in the cylinder. One of the additional benefits of using the present invention in this manner is the perfect fit 450 between the microcellular layer 120 that compresses and provides for an air tight seal with cylinder's surface 400 around each air feed hole 410. The pressurized air is fed up or sucked through the hole 420 with no incident loss of air escaping between the base of the anti-marking material 198/199 and the surface of the cylinder 400. The benefit of this perfect fit 450 is uniform air flow through each perforation 420. Uniform air flow means that the sheet 430 will float over the textured surface 110 and optional coatings 170 with no sags along the width due to variances in air pressure. The result is a mark free transfer of the wet inked sheet from one print station to the next.

An unanticipated and very effective use for the present invention 198/199 was discovered by applying it to the plate cylinder 2, blanket cylinder 3 and impression cylinder 4. In this embodiment, the microcellular layer 120 provided the required compressibility allowing tolerance for the plate to compress uniformly during the ink transfer to the blanket cylinder 3. It was found that choice of textured surface/ embossed pattern could be optimized for each cylinder, the hemisphere pattern performs quite well on the plate 2 and impression 4 cylinders; while to minimize cost, ordinary packing (paper/film) was laminated to the compressible microcellular layer 120 for the plate 2 and blanket 3 cylinders providing extraordinary compressible packing. For most economical cases, the microcellular layer 120 alone may be used as excellent compressible packing.

Another unanticipated and very effective use for the present invention 198/199 was discovered by slitting the anti-marking product into two inch wide rolls of tape and applying it to the transfer cylinders in flexographic/web printing machines. The product was applied to the transfer/ idler rolls in a spiral fashion such that the entire roll was covered uniformly with the present invention 198/199. The microcellular layer compressed slightly under constant application tension in such a manner as to provide a seamless uniform covering over the cylinder. The result is a non-slip, mark-free transfer of the wet inked web from one print station to the next.

A person of ordinary skill in the art will appreciate further features and advantages of the invention based on the above-described embodiments. For example, various elements and concepts employed in the embodiments described above may be intermixed in an anti-marking product for use anywhere that sheets having wet ink are transported within the spirit of the present invention. Accordingly, the invention is not to be limited by what has been particularly shown and described, except as indicated by the appended claims. All publications and references cited herein are expressly incorporated herein by reference in their entity.

What is claimed is:

1. A transfer element for uniformly supporting a freshly printed sheet material without marking, the transfer element comprising:

a transfer cylinder configured for transporting the freshly printed sheet material from one printing station to the next, the transfer cylinder having a uniform radius extending from a first longitudinal edge to a second longitudinal edge; and an anti-marking covering having: an inner flexible material that is resilient to compressive forces, wherein the inner flexible material comprises a microcellular layer; and an outer flexible substrate layer provided on the inner flexible material and having a textured surface protruding from a first side in a direction away from the inner flexible material for supporting the freshly printed sheet material;

wherein the anti-marking covering is disposed on the transfer cylinder so that the inner flexible material faces in the direction of the transfer cylinder and the outer flexible substrate layer faces away from the transfer cylinder.

2. The element of claim 1, wherein the textured surface comprises a fabric.

3. The element of claim 1, wherein the textured surface comprises a plurality of partially exposed spheroidal shaped elements having exposed convex portions ranging from about 0.1-20 thousandths of an inch.

4. The element of claim 1, wherein the outer flexible substrate layer is fixed to the inner flexible layer so that there is no relative movement therebetween.

5. The element of claim 1, wherein the textured surface is fixed to the outer flexible substrate layer so that there is no relative movement therebetween.

6. The element of claim 1, wherein the textured surface is treated for at least one selected from the group consisting of ink-repellency, anti-static properties, and conductive properties.

7. A transfer element for uniformly supporting a freshly printed sheet material as the freshly printed sheet material is conveyed from a first print station to a next station without marking, the transfer element comprising:

a transfer cylinder having an outer face configured to convey a freshly printed sheet from a first printing station to a next printing station, the transfer cylinder having a uniform radius extending from a first longitudinal edge to a second longitudinal edge;

an inner flexible microcellular material that is resilient to compressive forces provided on the outer face of the transfer cylinder;

an outer flexible substrate layer provided on the flexible microcellular material; and a textured surface element provided on the outer flexible substrate layer and having a textured surface protruding from a first side in a direction away from the outer flexible substrate layer for supporting the freshly printed sheet material;

wherein the textured surface element is a fabric.

8. The element of claim 7, wherein the inner flexible material comprises a microcellular foam.

9. The element of claim 7, wherein the outer flexible substrate layer comprises a textured surface comprising a plurality of partially exposed spheroidal shaped elements having exposed convex portions ranging from about 0.1-20 thousandths of an inch.

10. The element of claim 7, wherein the textured surface comprises a woven fabric.

11. The element of claim 7, wherein the textured surface comprises a non-woven fabric.

12. The element of claim 7, wherein the outer flexible substrate layer is fixed to the inner flexible layer so that there is no relative movement therebetween.

13. The element of claim 7, wherein the textured surface is fixed to the outer flexible substrate layer so that there is no relative movement therebetween.

14. The element of claim 7, wherein the fabric is treated for at least one selected from the group consisting of ink-repellency, anti-static properties, and conductive properties.

15. A transfer element for uniformly supporting a freshly printed sheet material as the freshly printed sheet material is conveyed from a first print station to a next station without marking, the transfer element comprising:

a transfer cylinder having an outer face configured to convey a freshly printed sheet from a first printing station to a next printing station, the transfer cylinder having a uniform radius extending from a first longitudinal edge to a second longitudinal edge; and an anti-marking covering having:

an inner flexible material that is resilient to compressive forces, wherein the inner flexible material comprises a microcellular layer; and an outer flexible substrate layer provided on the inner flexible material and having a textured surface protruding from a first side in a direction away from the inner flexible material for supporting the freshly printed sheet material; wherein the anti-marking covering is provided on the transfer cylinder in a spiral fashion to cover the transfer cylinder uniformly.

16. The element of claim 15, wherein the inner flexible material is applied to the transfer cylinder under tension so as to compress slightly.

17. The element of claim 16, wherein the inner flexible material is adhered to the outer face by a pressure sensitive adhesive.

* * * * *